US010793278B1

(12) United States Patent
Roeder

(10) Patent No.: US 10,793,278 B1
(45) Date of Patent: Oct. 6, 2020

(54) SEAT POSITIONING SYSTEMS AND METHODS

(71) Applicant: THE BOEING COMPANY, Chicago, IL (US)

(72) Inventor: Raymond Roeder, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/368,934

(22) Filed: Mar. 29, 2019

(51) Int. Cl.
*B64D 11/06* (2006.01)
(52) U.S. Cl.
CPC ........ *B64D 11/064* (2014.12); *B64D 11/0696* (2013.01)
(58) Field of Classification Search
CPC .......................... B64D 11/064; B64D 11/0696
See application file for complete search history.

(56) References Cited

U.S. PATENT DOCUMENTS

| | | | | |
|---|---|---|---|---|
| 4,796,837 A * | 1/1989 | Dowd | ................ | B64D 11/0696 244/122 R |
| 5,178,346 A * | 1/1993 | Beroth | ................... | B64D 9/003 244/118.1 |
| 5,337,979 A * | 8/1994 | Bales | ................. | B64D 11/0696 244/118.1 |
| 5,871,318 A * | 2/1999 | Dixon | ................ | B60N 2/01558 244/118.1 |
| 7,410,127 B1 * | 8/2008 | Ahad | ................. | B64D 11/0696 244/118.5 |
| 7,506,855 B2 * | 3/2009 | Frantz | ....................... | B64C 1/20 244/118.1 |
| 7,695,225 B2 * | 4/2010 | Pozzi | .................... | B60N 2/0825 410/104 |
| 7,713,009 B2 | 5/2010 | Hudson | | |
| 7,785,053 B2 | 8/2010 | Hudson | | |
| 8,128,326 B2 | 3/2012 | Hudson | | |
| 8,191,829 B2 * | 6/2012 | Erickson | ................... | B64C 1/20 244/118.5 |
| 8,292,224 B1 * | 10/2012 | Ahad | ................. | B61D 33/0057 244/118.6 |
| 8,371,781 B2 * | 2/2013 | Roy | .................... | B64D 11/0696 410/104 |
| 8,920,085 B2 | 12/2014 | Hudson | | |
| 9,296,482 B2 * | 3/2016 | Jones | ................. | B64D 11/0696 |
| 9,567,086 B2 | 2/2017 | Siegmeth | | |
| 2010/0124457 A1 * | 5/2010 | Cook | ................. | B60N 2/01558 403/409.1 |
| 2015/0145298 A1 * | 5/2015 | Wottke | ................... | B64D 11/06 297/243 |

OTHER PUBLICATIONS

U.S. Appl. No. 16/365,788, filed Mar. 27, 2019.
U.S. Appl. No. 16/365,777, filed Mar. 27, 2019.
(Continued)

*Primary Examiner* — Anita M King
(74) *Attorney, Agent, or Firm* — The Small Patent Law Group LLC; Joseph M. Butscher

(57) ABSTRACT

A seat positioning system and method for an internal cabin of a vehicle includes a seat track, and a keying assembly that provides expanded openings in relation to the seat track. The expanded openings are arranged in a pattern for proper positioning of a seat assembly. The expanded openings are configured to receive securing studs of the seat assembly.

20 Claims, 8 Drawing Sheets

(56) References Cited

OTHER PUBLICATIONS

U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/671,238, filed Nov. 1, 2019.

* cited by examiner

US 10,793,278 B1

SEAT POSITIONING SYSTEMS AND METHODS

FIELD OF EMBODIMENTS OF THE DISCLOSURE

Embodiments of the present disclosure generally relate to seat positioning systems and methods, and more particularly, to seat positioning systems and methods that allow for efficient and reliable positioning of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

As a commercial aircraft is being manufactured, passenger seats are secured within an internal cabin. Because a commercial aircraft may include different sections having different pitches between rows of seats, the process of positioning and securing seats at defined positions within an internal cabin is time and labor intensive. For example, in order to position a seat at a desired location within an internal cabin, an individual typically first measures a distance from a particular location to the define location for the seat.

Additionally, after the aircraft is manufactured and is in service, between flights of the aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section. When the seats are reconfigured, care it taken to ensure that the seats are located at proper positions. Also, when seats are relocated, various other structures and components (such as floor mounted stowage, class dividing panels, closets, and the like) are adjusted to accommodate the relocation.

As noted, the process of properly positioning seats within an internal cabin is time and labor intensive. If one or more seats are positioned at even slightly different positions than preferred, defined locations, one or more sections within a commercial aircraft may be affected, in that spacing between different certain rows may not be as intended. Further, there is a relatively short time until a subsequent flight, there may not be sufficient time to adjust the seats to new positions.

SUMMARY OF THE DISCLOSURE

A need exists for an efficient system and method for ensuring that seats are properly located within an internal cabin of a vehicle. Further, a need exists for a system and method that allow for quick and efficient adjustment of seats within an internal cabin.

With those needs in mind, certain embodiments of the present disclosure provide a seat positioning system for an internal cabin of a vehicle. The seat positioning system includes a seat track, and a keying assembly that provides expanded openings in relation to the seat track. The expanded openings are arranged in a pattern for proper positioning of a seat assembly. The expanded openings are configured to receive securing studs of the seat assembly.

The pattern is associated with an arrangement of the securing studs of the seat assembly. In at least one embodiment, the expanded openings are in a non-uniform distribution over a length of the seat track.

In at least one embodiment, the keying assembly is integrally formed with the seat track. In at least one embodiment, a first expanded opening is separated from a second expanded opening by a constricted area of the seat track, wherein the constricted area is devoid of the expanded openings.

In at least one embodiment, the keying assembly includes one or more blocking inserts positioned within blocked expanded openings. The blocking insert(s) may include a base that seats within a track channel of the seat track, and a blocking stud coupled to the base. The blocking stud includes a head that extends into or above one of the blocked expanded openings. The blocking insert(s) may also include one or more blocking fins extending from the head. The blocking fin(s) fit into openings between opposed retaining arms of the seat track and extend into at least one of the blocked expanded openings.

In at least one embodiment, the keying assembly includes a cover track coupled to at least a portion of the seat track. The cover track arranges the expanded openings in the pattern for proper positioning of the seat assembly. The cover track may extend above a plane of a top surface of the seat track.

In at least one embodiment, the keying assembly includes one or more blocking inserts positioned within blocked expanded openings, and a cover track coupled to at least a portion of the seat track.

Certain embodiments of the present disclosure provide a seat positioning method for an internal cabin of a vehicle that include includes providing expanded openings in relation to a seat track with a keying assembly. The forming includes arranging the expanded openings in a pattern for proper positioning of a seat assembly. The method also includes receiving securing studs of the seat assembly within the expanded openings.

The providing includes associating the pattern with an arrangement of the securing studs of the seat assembly. In at least one embodiment, the providing includes arranging the expanded openings in a non-uniform distribution over a length of the seat track.

In at least one embodiment, the providing includes integrally forming the keying assembly with the seat track. The providing may include separating a first expanded opening from a second expanded opening by a constricted area of the seat track, wherein the constricted area is devoid of the expanded openings.

In at least one embodiment, the providing includes positioning one or more blocking inserts within blocked expanded openings. The positioning includes seating a base of the blocking insert(s) within a track channel of the seat track, and extending a head coupled to the base into or above one of the blocked expanded openings.

In at least one embodiment, the providing includes coupling a cover track including the keying assembly to at least a portion of the seat track. The providing may include extending the cover track above a plane of a top surface of the seat track.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat positioning systems and methods that include a keying assembly that ensures that a seating assembly is properly positioned within an internal cabin. The keying assembly provides a pattern of expanded openings that receive securing studs of the seating assembly. The pattern is associated with the arrangement of securing studs of the seating assembly and ensures that the seating assembly is positioned at a desired location within the internal cabin.

A typical seat track includes discrete expanded openings regularly and uniformly spaced along a length of the seat track. For example, the expanded openings are spaced in one inch increments along a length of the seat track.

Embodiments of the present disclosure provide a keying assembly having expanded openings in a non-uniform distribution over a length of a seat track. In at least one embodiment, the expanded openings are provided in a seat track at locations where seats are regulatory authority certified to be secured. The keying assembly may be used within specific zones of an internal cabin that provide areas of no seating and/or areas with different pitches between rows of seats.

Figure 1:
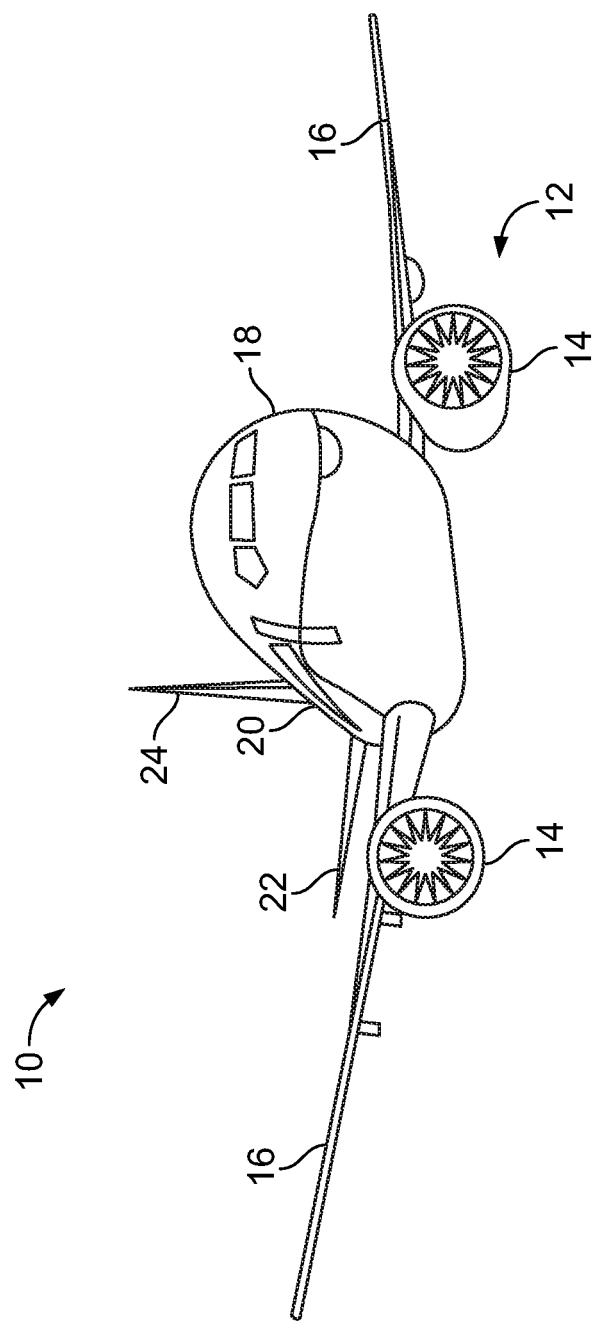
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
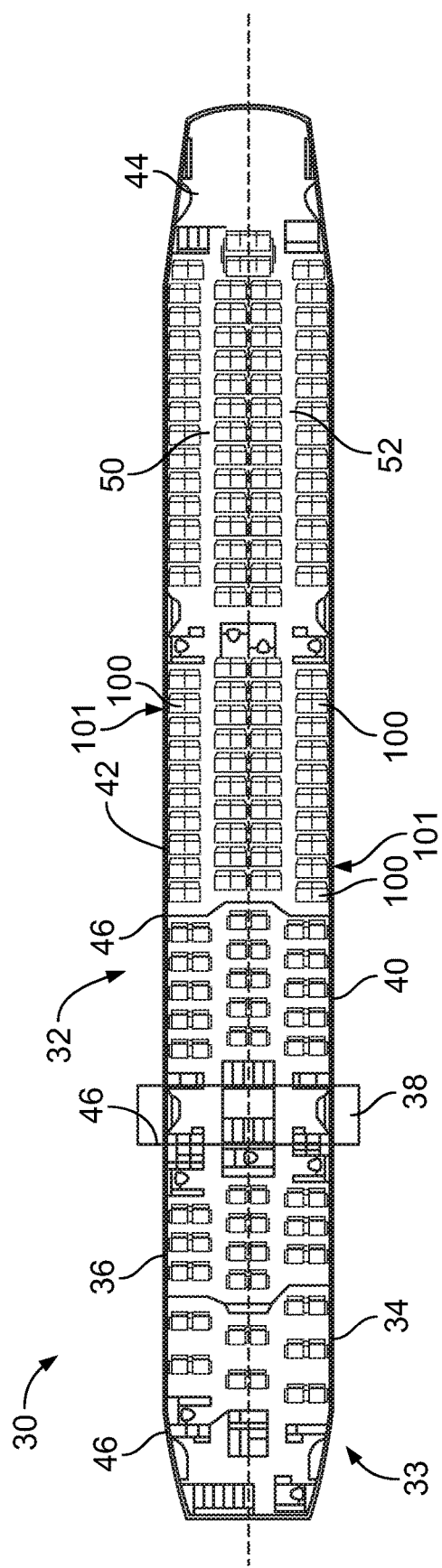
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101.

Figure 2B:
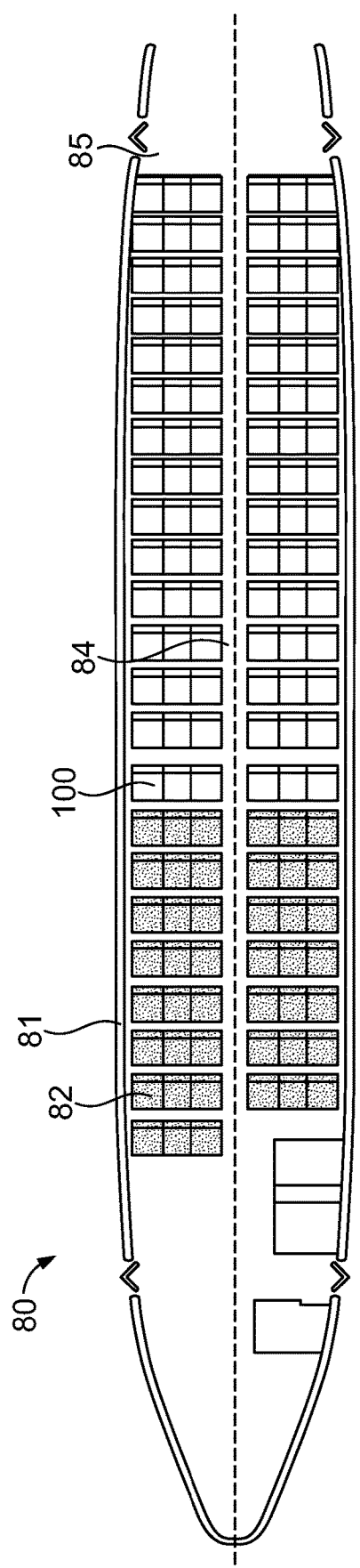
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
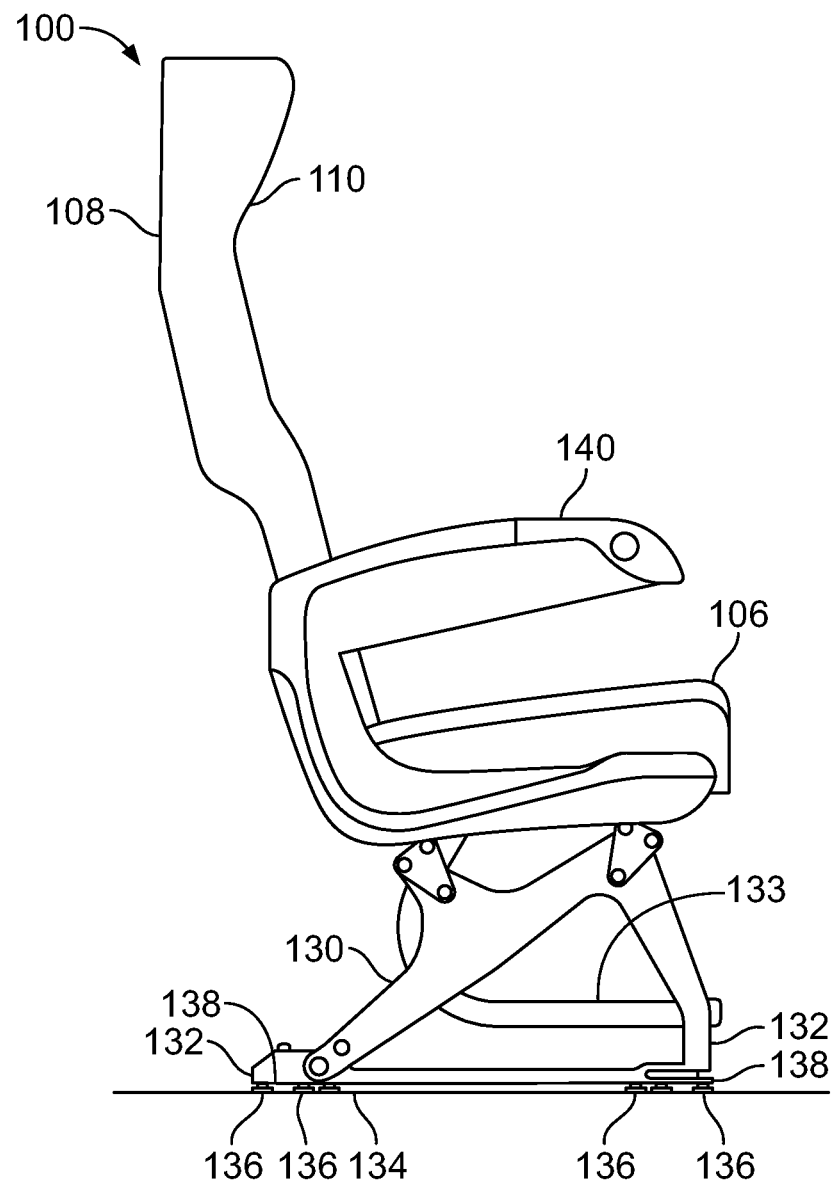
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

Figure 4:
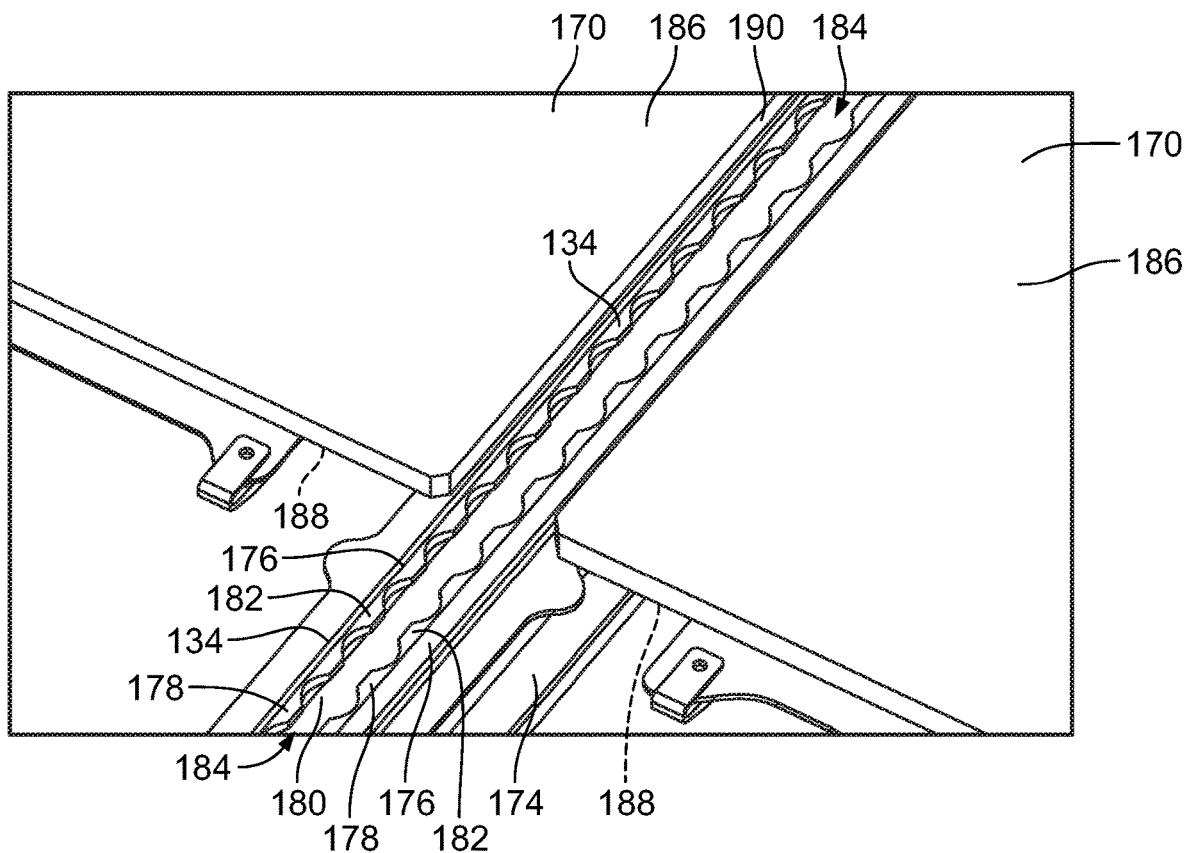
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Figure 5:
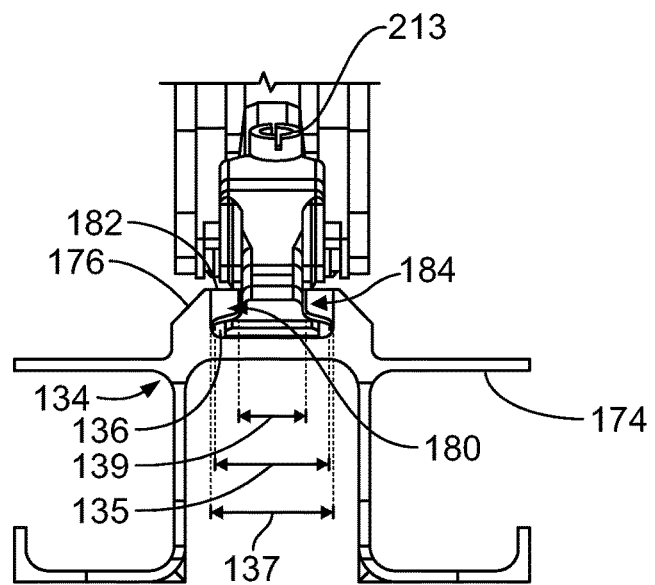
FIG. 5 illustrates an end view of a securing stud within a track channel of a seat track, according to an embodiment of the present disclosure.

FIG. 5 illustrates an end view of a securing stud 136 within a track channel 184 of a seat track 134, according to an embodiment of the present disclosure. Referring to FIGS. 3-5, the securing studs 136 of the seat assembly 100 may have a circular cross section and a width 135 that is less than a width 137 of the expanded openings 180. The width 135 is greater than a width 137 of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting 213 (such as a bolt or other such fastener) is manipulated to unlock the legs 132. For example, the lock fitting 213 may be loosened such that a distal end no longer engages a portion of the seat track 134. Optionally, the seat assembly 100 may not include lock fittings.

After the lock fitting 213 disengages from the seat track 134, the seat assembly 100 may be longitudinally shifted in relation to the seat track 134. The seat assembly 100 is shifted so that the securing studs 136 are no longer underneath the retaining arms 182, but are instead within the expanded openings 180. After the securing studs 136 are in the expanded openings 180, the seat assembly 100 may be removed from the seat track 134, and/or moved to a different position on the seat track 134 via a seat adjustment system.

Figure 6:
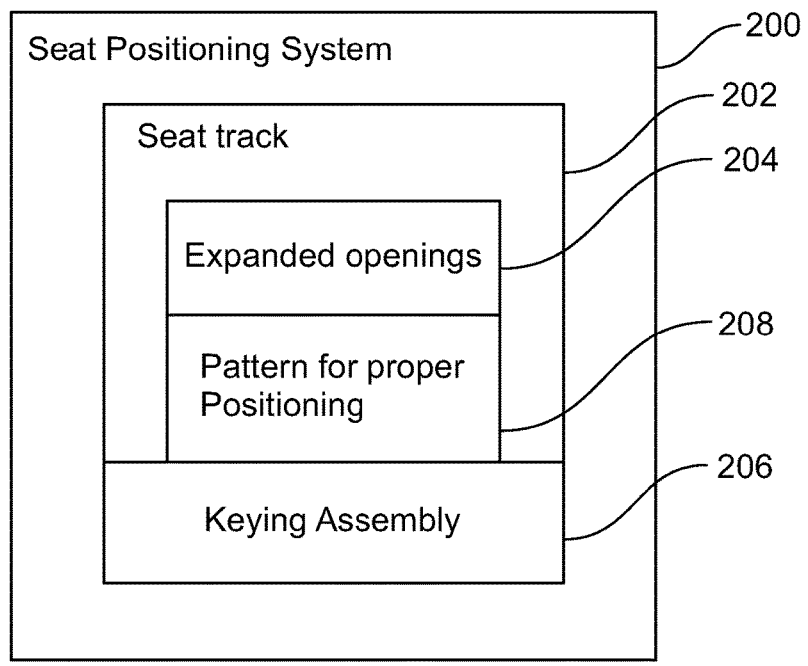
FIG. 6 illustrates a schematic block diagram of a seat positioning system, according to an embodiment of the present disclosure.

FIG. 6 illustrates a schematic block diagram of a seat positioning system 200, according to an embodiment of the present disclosure. The seat positioning system 200 includes a seat track 202, and a keying assembly 206 that provides expanded openings 204 in relation to the seat track 202. The expanded openings 204 are arranged in a pattern 208 for proper positioning of a seat assembly, such as the seat assembly 100 shown in FIG. 3, at a desired location. The expanded openings 204 are configured to receive the securing studs 136 of the seat assembly 100.

In a least one embodiment, the keying assembly 206 is integrally formed with the seat track 202. That is, the seat track 202 includes the keying assembly 206. For example, the seat track 202 may be machined or molded as a monolithic structure that includes the keying assembly 206. In at least one other embodiment, the keying assembly 206 includes blocking inserts that are disposed within certain expanded openings of the seat track 202 (or the seat track 134) that are blocked from use by the blocking inserts. In at least one other embodiment, the keying assembly 206 includes a cover track positioned over a portion of the seat track 202 (or the seat track 134). The cover track provides the pattern 208 having the expanded openings 204. As such, a standard seat track may be retrofit with the blocking inserts or the cover track to provide the pattern 208 for proper positioning.

The pattern 208 is associated with the arrangement of securing studs 136 of the seating assembly 100, and ensures that the seating assembly 100 is positioned at a desired location within the internal cabin.

In at least one embodiment, the keying assembly 206 forms the pattern 208 of the expanded openings 204 in a non-uniform distribution over a length of the seat track 202. In at least one embodiment, the expanded openings 204 are provided in the seat track 202 at locations where seats are regulatory authority certified to be secured. The keying assembly 206 may be used within specific zones of an internal cabin that provide areas of no seating and/or areas with different pitches between rows of seats.

Figure 7:
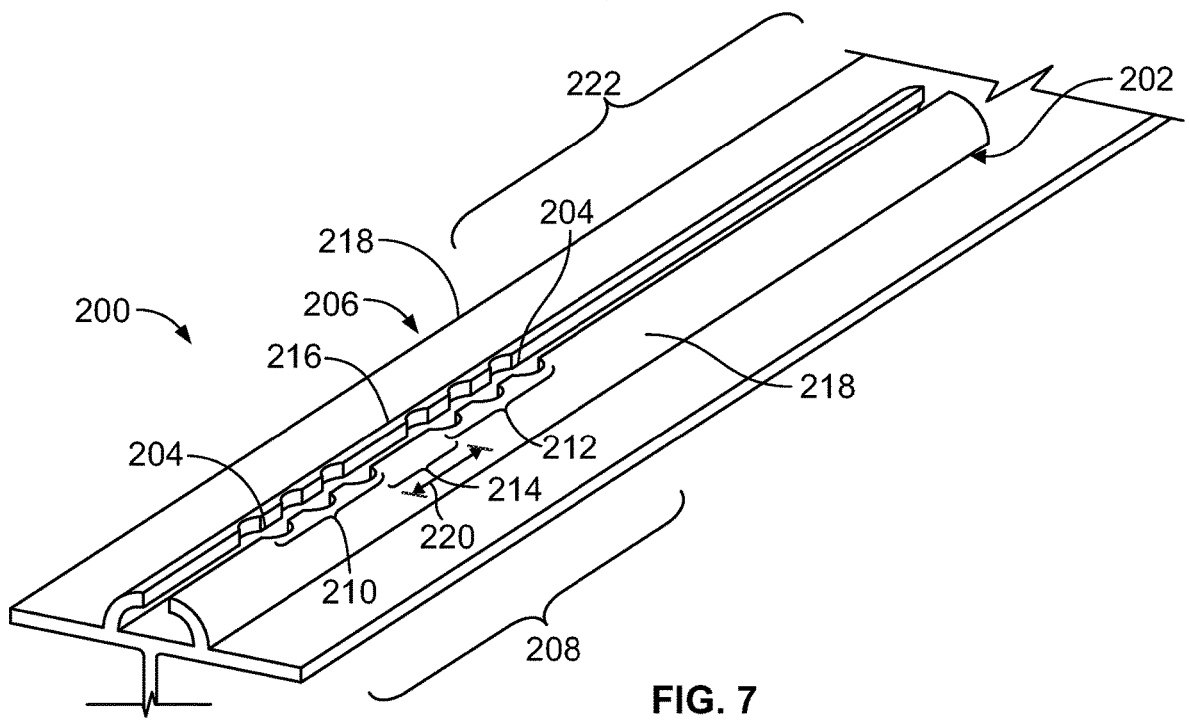
FIG. 7 illustrates a perspective top view of the seat positioning system including a seat track having a keying assembly, according to an embodiment of the present disclosure.

FIG. 7 illustrates a perspective top view of the seat positioning system 200 including the seat track 202 having the keying assembly 206, according to an embodiment of the present disclosure. The seat track 202 includes the keying assembly 206. The keying assembly 206 is integrally formed with the seat track 202 (as opposed to being separately mounted or secured to the seat track 202). That is, as shown in FIG. 7, the seat track 202 including the keying assembly 206 is formed as a monolithic part.

The keying assembly 206 forms the pattern 208 of expanded openings 204 (examples of which are described with respect to the expanded openings 180 of FIGS. 4 and 5). As shown, the expanded openings 204 are not uniformly and regularly spaced along an entire length of the seat track 202. Instead, the keying assembly 206 includes a first group 210 of expanded openings 204 separated from a second group 212 of expanded openings 204 by a constricted area 214 defined by elongated retaining arms 216 of the retaining lips 218. The first group 210 and the second group 212 are separated by the constricted area, which extends over a length 220 that exceeds one inch. Additionally, the keying assembly includes another constricted area 222 that is devoid of expanded openings. As such, the keying assembly 206 ensures that the seating assembly 100 (such as shown in FIG. 3) is mountable only in relation to the pattern 208, but not the constricted areas 214 and 212. In this manner, the keying assembly 206 ensures proper positioning of the seating assembly 100 at specified positions, such as approved by a regulatory authority.

As shown, each group 210 and 212 includes three expanded openings 204. Optionally, the groups 210 and 212 may include less or more than three expanded openings 204, depending on the arrangement of securing studs 136 (shown in FIGS. 3 and 5) of the seating assembly 100. Further, the keying assembly 206 may include more or less than two groups. For example, the keying assembly 206 may provide a single group of expanded openings. In at least one other embodiment, the keying assembly may provide three of more groups of expanded openings. In at least one other embodiment, a single expanded opening may be separated from another expanded opening or a group of expanded openings by a constricted area. That is, the keying assembly 206 may provide expanded openings that are not necessarily in groups.

Figure 8:
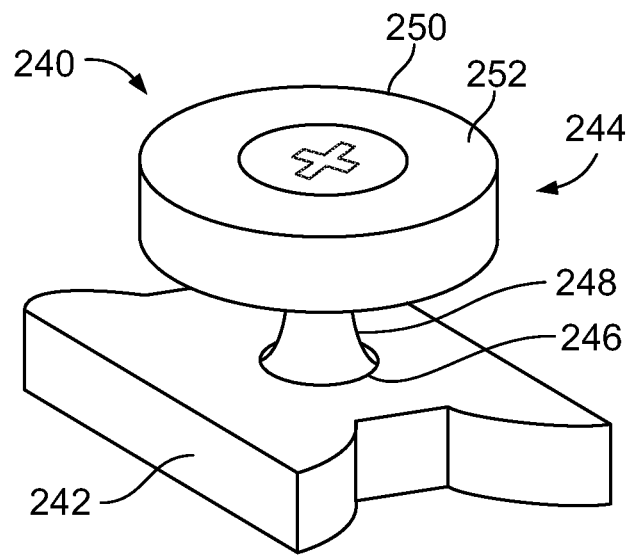
FIG. 8 illustrates a perspective top view of a blocking insert, according to an embodiment of the present disclosure.

FIG. 8 illustrates a perspective top view of a blocking insert 240, according to an embodiment of the present disclosure. The blocking insert 240 includes a base 242 that receives and retains a blocking stud 244. The base 242 is configured to seat within a track channel of a seat track, such as the track channel 184 of the seat track 134, as shown in FIG. 4. The base 242 includes a retaining hole 246 that receives and retains a shaft 248 of the blocking stud 244. A head 250 connects to the shaft 248 and extends above the base 246. The head 250 is configured to extend into and/or above an expanded opening of the blocking insert 240 to prevent a securing stud from being inserted into the blocked expanded opening.

Figure 9:
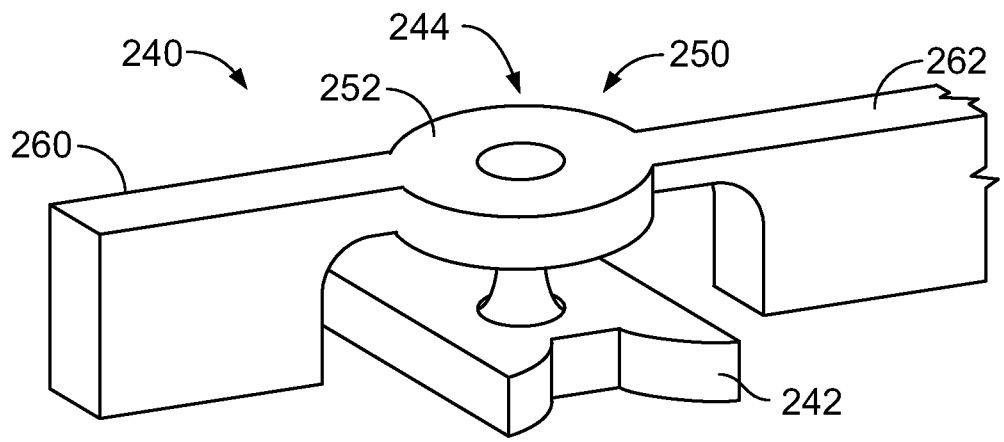
FIG. 9 illustrates a perspective top view of a blocking insert, according to an embodiment of the present disclosure.

FIG. 9 illustrates a perspective top view of a blocking insert 240, according to an embodiment of the present disclosure. The blocking insert 240 of FIG. 9 is similar to the blocking insert 240 of FIG. 8, except that blocking fins 260 and 262 extend outwardly from the head 250. The blocking fins 260 and 262 are sized and shaped to fit into openings between opposed retaining arms of a seat track and extend into expanded openings. The blocking insert 240 may include less than two blocking fins 260 and 262. Further, the blocking fins 260 and 262 may be longer or shorter than shown. In at least one embodiment, the top surface 252 of the head 250 and the blocking fins 260 and 262 may be configured to extend above a top surface of the seat track 202 to offset the top surface of the seat track 202 from the seat assembly 100, thereby reducing a potential of the seat assembly 100 adversely engaging the seat track 202. Further, the blocking fins 260 and 262 and/or head 250 may be formed of, or coated with, a low friction material.

Figure 10:
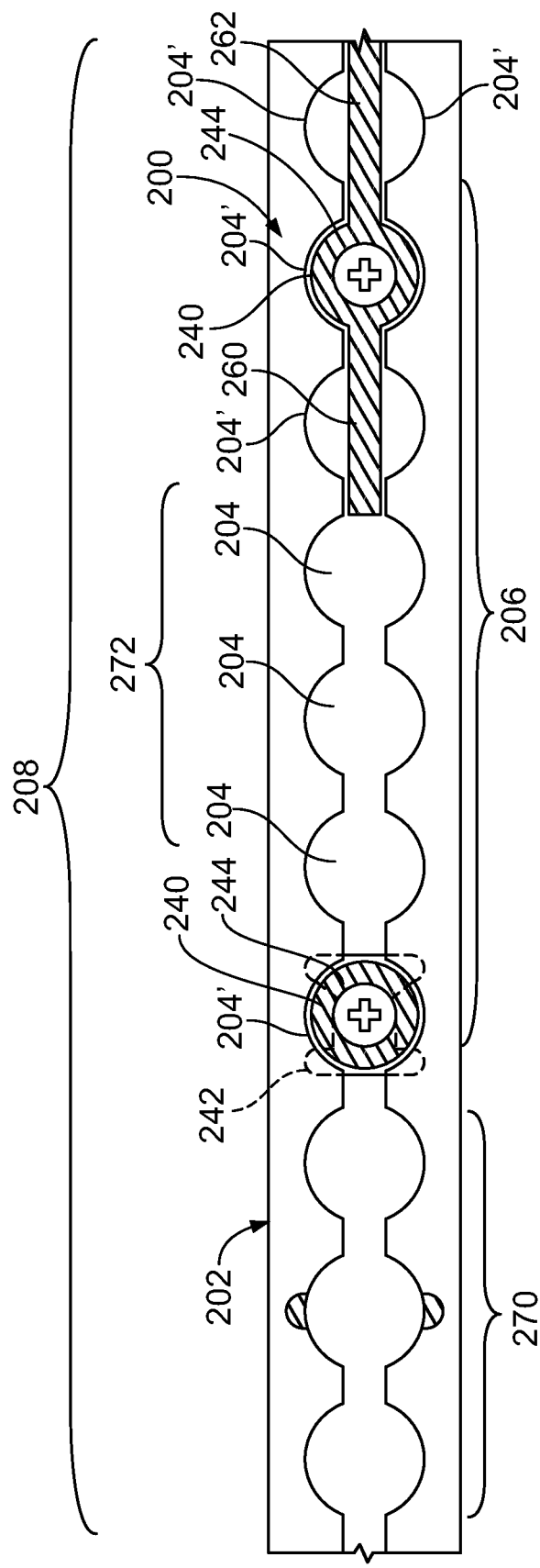
FIG. 10 illustrates a top view of the seat positioning system including a keying assembly including blocking inserts within expanded openings of a seat track, according to an embodiment of the present disclosure.

FIG. 10 illustrates a top view of the seat positioning system 200 including a keying assembly including blocking inserts 240 within expanded openings 204' of a seat track 202, according to an embodiment of the present disclosure. As shown, the blocking inserts 240 block the expanded openings 204', thereby preventing securing studs from being positioned therein. The expanded openings 204' are blocked expanded openings.

The keying assembly 206, via the blocking inserts 240, forms the pattern 208 of expanded openings 204. As shown, the expanded openings 204 are not uniformly and regularly spaced along an entire length of the seat track 202. Instead, the keying assembly 206 via the blocking inserts 240 forms a first group 270 of expanded openings 204 separated from a second group 272 of expanded openings 204. As such, the keying assembly 206 ensures that the seating assembly 100 (such as shown in FIG. 3) is mountable only in relation to the pattern 208, but not the blocked areas, as defined by the blocking inserts 240. In this manner, the keying assembly 206 ensures proper positioning of the seating assembly 100 at specified positions, such as approved by a regulatory authority.

A standard seat track 134 may be retrofit with the blocking inserts 240 to provide the pattern 208 for proper positioning of a seating assembly. The keying assembly 206 may include more or less blocking inserts 240 than shown, depending on the arrangement of securing studs 136 (shown in FIGS. 3 and 5) of the seating assembly 100.

Figure 11:
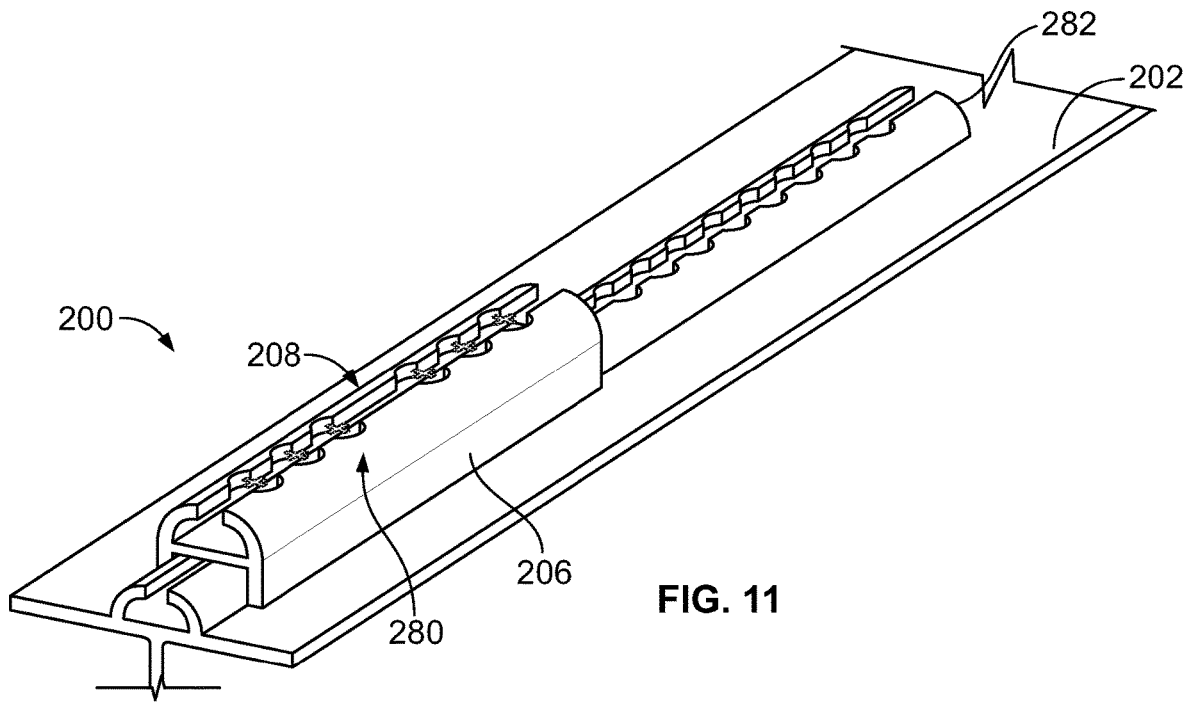
FIG. 11 illustrates a perspective top view of the seat positioning system including a keying assembly including a cover track mounted on top of a seat track, according to an embodiment of the present disclosure.
Figure 12:
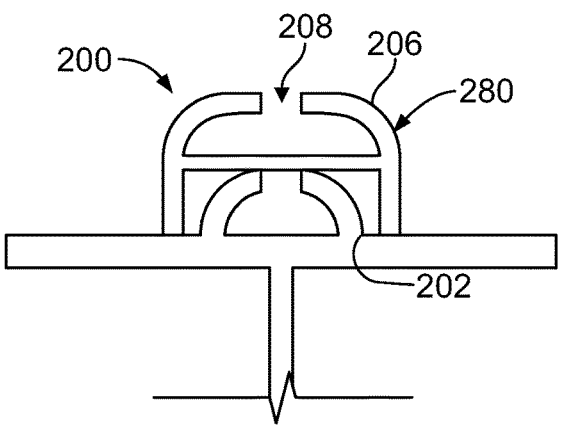
FIG. 12 illustrates an end view of the seat positioning system including the keying assembly including the cover track mounted on top of the seat track.

FIG. 11 illustrates a perspective top view of the seat positioning system 200 including a keying assembly 206 including a cover track 280 mounted on top of a seat track 202, according to an embodiment of the present disclosure. FIG. 12 illustrates an end view of the seat positioning system 200 including the keying assembly 206 including the cover track 280 mounted on top of the seat track 202.

The cover track 280 is positioned over a portion of the seat track 202. The cover track 280 provides the pattern 208 having the expanded openings 204. As such, a standard seat track may be retrofit with the cover track 280 to provide the pattern 208 for proper positioning of a seating assembly.

The cover track 280 may be secured to the seat track 202 through one or more fasteners, adhesives, and or the like. The cover track 280 is positioned above a plane of a top surface 282 of the seat track 202, thereby providing a discernable location at which to mount a seating assembly. That is, the cover track 280 provides a heightened area that is readily visible. The cover track 280 provides groups of expanded openings, as described above with respect to FIG. 7.

Referring to FIGS. 8-12, in at least one embodiment, the keying assembly 206 includes the cover track 280 mounted to the seat track 202, as well as at least one blocking insert 240.

Figure 13:
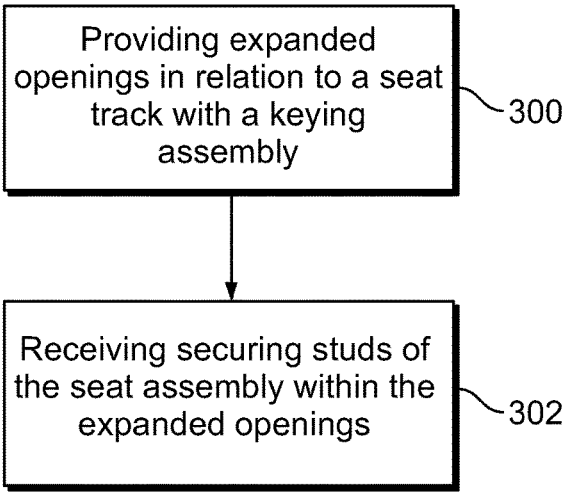
FIG. 13 illustrates a flow chart of a seat positioning method for an internal cabin of a vehicle, according to an embodiment of the present disclosure.

FIG. 13 illustrates a flow chart of a seat positioning method for an internal cabin of a vehicle. The seat positioning method includes providing, at 300, expanded openings in relation to a seat track with a keying assembly. The forming includes arranging the expanded openings in a pattern for proper positioning of a seat assembly. The method also includes receiving, at 302, securing studs of the seat assembly within the expanded openings.

In at least one embodiment, after the expanded openings are provided, portions of the seat track may be blocked, such as certain expanded openings, by blocking inserts, expanded length lips, and/or the like. Further, prior to receiving the securing studs, a seat assembly may be adjusted to a desired position. The seat assembly may be quickly and efficiently moved to a desired location without the need for measurement, due to the embodiments of the present disclosure.

The providing includes associating the pattern with an arrangement of the securing studs of the seat assembly. In at least one embodiment, the providing includes arranging the expanded openings in a non-uniform distribution over a length of the seat track.

In at least one embodiment, the providing includes integrally forming the keying assembly with the seat track. The providing may include separating a first expanded opening from a second expanded opening by a constricted area of the seat track, wherein the constricted area is devoid of the expanded openings.

In at least one embodiment, the providing includes positioning one or more blocking inserts within blocked expanded openings. The positioning includes seating a base of the blocking insert(s) within a track channel of the seat track, and extending a head coupled to the base into or above one of the blocked expanded openings.

In at least one embodiment, the providing includes coupling a cover track including the keying assembly to at least a portion of the seat track. The providing may include extending the cover track above a plane of a top surface of the seat track.

As explained herein, embodiments of the present disclosure provide an efficient systems and methods for identifying proper locations for seats within an internal cabin of a vehicle. Further, embodiments of the present disclosure provide systems and methods that allow for quick and efficient adjustment of seats (and other such components, such as floor mounted stowage, class dividing panels, closets, and the like) within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat positioning system for an internal cabin of a vehicle, the seat positioning system comprising:
   a seat track; and
   a keying assembly that provides expanded openings in relation to the seat track,
   wherein the expanded openings are arranged in a pattern for proper positioning of a seat assembly,
   wherein the expanded openings are configured to receive securing studs of the seat assembly, and
   wherein the expanded openings are in a non-uniform distribution over a length of the seat track.

2. The seat positioning system of claim 1, wherein the pattern is associated with an arrangement of the securing studs of the seat assembly.

3. The seat positioning system of claim 1, wherein the keying assembly is integrally formed with the seat track.

4. The seat positioning system of claim 3, wherein a first expanded opening is separated from a second expanded opening by a constricted area of the seat track, wherein the constricted area is devoid of the expanded openings.

5. The seat positioning system of claim 1, wherein the keying assembly includes one or more blocking inserts positioned within blocked expanded openings.

6. The seat positioning system of claim 5, wherein the one or more blocking inserts comprises:
   a base that seats within a track channel of the seat track; and
   a blocking stud coupled to the base, wherein the blocking stud includes a head that extends into or above one of the blocked expanded openings.

7. The seat positioning system of claim 6, wherein the one or more blocking inserts further comprises one or more blocking fins extending from the head, wherein the one or more blocking fins fit into openings between opposed retaining arms of the seat track and extend into at least one of the blocked expanded openings.

8. The seat positioning system of claim 6, wherein the one or more blocking inserts extend above a plane of a top surface of the seat track.

9. The seat positioning system of claim 1, wherein the keying assembly includes a cover track coupled to at least a portion of the seat track.

10. The seat positioning system of claim 9, wherein the cover track arranges the expanded openings in the pattern for proper positioning of the seat assembly.

11. The seat positioning system of claim 9, wherein the cover track extends above a plane of a top surface of the seat track.

12. The seat positioning system of claim 1, wherein the keying assembly comprises:
   one or more blocking inserts positioned within blocked expanded openings; and
   a cover track coupled to at least a portion of the seat track.

13. The seat positioning system of claim 1, wherein the expanded openings are provided at locations where seat assemblies are regulatory authority certified to be secured.

14. A seat positioning method for an internal cabin of a vehicle, the seat positioning method comprising:
   providing expanded openings in relation to a seat track with a keying assembly, wherein the providing includes arranging the expanded openings in a pattern for proper positioning of a seat assembly, wherein the providing comprises associating the pattern with an arrangement of the securing studs of the seat assembly, and wherein the providing comprises arranging the expanded openings in a non-uniform distribution over a length of the seat track; and
   receiving securing studs of the seat assembly within the expanded openings.

15. The seat positioning method of claim 14, wherein the providing further comprises integrally forming the keying assembly with the seat track.

16. The seat positioning method of claim 15, wherein the providing further comprises separating a first expanded opening from a second expanded opening by a constricted area of the seat track, wherein the constricted area is devoid of the expanded openings.

17. The seat positioning method of claim 14, wherein the providing further comprises positioning one or more blocking inserts within blocked expanded openings.

18. The seat positioning method of claim 17, wherein the positioning comprises:
   seating a base of the one or more blocking inserts within a track channel of the seat track; and
   extending a head coupled to the base into or above one of the blocked expanded openings.

19. The seat positioning method of claim 14, wherein the providing further comprises:
   coupling a cover track including the keying assembly to at least a portion of the seat track; and
   extending the cover track above a plane of a top surface of the seat track.

20. The seat positioning method of claim 14, wherein the providing further comprises providing the expanded openings at locations where seat assemblies are regulatory authority certified to be secured.

* * * * *